(12) United States Patent
Dillinger et al.

(10) Patent No.: US 8,939,415 B2
(45) Date of Patent: Jan. 27, 2015

(54) ROOFTOP DEVICE AND ROOFTOP DEVICE ASSEMBLIES

(76) Inventors: James Dillinger, Amherst, OH (US); Michael J. Rich, North Ridgeville, OH (US)

( * ) Notice: Subject to any disclaimer, the term of this patent is extended or adjusted under 35 U.S.C. 154(b) by 0 days.

(21) Appl. No.: 13/608,498

(22) Filed: Sep. 10, 2012

(65) Prior Publication Data

US 2013/0240699 A1    Sep. 19, 2013

Related U.S. Application Data

(60) Provisional application No. 61/532,308, filed on Sep. 8, 2011.

(51) Int. Cl.
E04G 3/26 (2006.01)
F16M 13/02 (2006.01)

(52) U.S. Cl.
CPC ............... *F16M 13/02* (2013.01); *E04G 3/265* (2013.01)
USPC ......... 248/237; 248/148; 248/188.2; 248/439

(58) Field of Classification Search
CPC .............. B44D 3/14; E04G 3/26; E04G 1/36; E04D 15/00
USPC ......... 248/148, 150, 237, 130, 135, 137, 188, 248/188.2, 188.6, 188.7, 188.8, 440, 440.1, 248/139, 439; 220/628
See application file for complete search history.

(56) References Cited

U.S. PATENT DOCUMENTS

| | | | | |
|---|---|---|---|---|
| 403,636 A * | 5/1889 | Bitterley | ........................ | 182/20 |
| 533,505 A * | 2/1895 | Stagman | ........................ | 248/129 |
| 1,148,919 A * | 8/1915 | Nielsen | ........................ | 248/237 |
| 1,453,547 A * | 5/1923 | Culver et al. | ................. | 248/136 |
| 1,609,207 A * | 11/1926 | Schlabaugh | ................. | 248/136 |
| 1,770,097 A * | 7/1930 | Bede | ............................. | 248/237 |
| 1,960,181 A * | 5/1934 | Dreier | .......................... | 108/132 |
| 2,354,941 A * | 8/1944 | Treitel | ......................... | 280/641 |
| 2,467,866 A * | 4/1949 | Smolderen et al. | ........... | 248/136 |
| 2,731,225 A * | 1/1956 | Cayo | ............................. | 248/536 |
| 2,837,304 A * | 6/1958 | Goss, Sr. | ...................... | 248/514 |
| 3,058,542 A * | 10/1962 | Rogalla | .......................... | 182/45 |
| 3,167,205 A * | 1/1965 | Smith | .......................... | 248/133 |
| 3,777,920 A * | 12/1973 | Wiese | .......................... | 414/421 |
| 4,962,906 A | 10/1990 | Fatool et al. | | |
| 5,193,773 A * | 3/1993 | Middleton | .................... | 248/148 |
| 5,217,193 A | 6/1993 | Drucker | | |
| 5,275,365 A * | 1/1994 | Gerbel et al. | ................. | 248/129 |
| 5,474,271 A * | 12/1995 | Raymond | ..................... | 248/237 |
| 5,771,992 A * | 6/1998 | Snyder | .......................... | 182/200 |
| 5,887,406 A | 3/1999 | Bond | | |
| 5,960,904 A * | 10/1999 | Ullmann | ........................ | 182/45 |
| 6,269,905 B1 * | 8/2001 | Smith | ............................ | 182/45 |
| 7,337,731 B2 * | 3/2008 | Mu et al. | ....................... | 108/132 |

(Continued)

FOREIGN PATENT DOCUMENTS

NL    1000367 A  * 11/1996
NL    1000367 C6 * 11/1996

*Primary Examiner* — Terrell McKinnon
*Assistant Examiner* — Eret McNichols
(74) *Attorney, Agent, or Firm* — Black, McCuskey, Souers & Arbaugh, LPA

(57) ABSTRACT

A rooftop device has a generally planar platform and first and second legs which extend from the platform and are pivotally attached to the platform and configured for contact with and mounting to a roof surface to support the platform in a generally horizontal position on a roof.

1 Claim, 6 Drawing Sheets

(56) References Cited

U.S. PATENT DOCUMENTS

| | | | |
|---|---|---|---|
| 7,427,080 B2 * | 9/2008 | Naude et al. | 280/639 |
| 7,543,614 B2 * | 6/2009 | Wise | 144/286.5 |
| 7,798,461 B2 * | 9/2010 | Hackney | 248/371 |
| 7,874,451 B2 | 1/2011 | Bel | |
| 7,887,016 B2 | 2/2011 | Gunsaullus | |
| 7,984,821 B1 | 7/2011 | Malmberg | |
| 8,256,731 B2 | 9/2012 | Wickwire | |
| 8,408,145 B2 * | 4/2013 | Chen | 108/128 |
| 2002/0139282 A1 * | 10/2002 | Liu | 108/131 |
| 2003/0217890 A1 * | 11/2003 | Nicolaysen | 182/45 |
| 2004/0169115 A1 | 9/2004 | Glenn et al. | |
| 2006/0091625 A1 * | 5/2006 | Naude et al. | 280/33.991 |
| 2006/0226310 A1 | 10/2006 | Hall et al. | |
| 2008/0035803 A1 | 2/2008 | Ingalls | |
| 2008/0282941 A1 * | 11/2008 | Wise | 108/50.17 |
| 2009/0050761 A1 | 2/2009 | Gunsaullus | |
| 2010/0213005 A1 * | 8/2010 | Sistonen et al. | 182/45 |
| 2011/0314769 A1 * | 12/2011 | Foster et al. | 52/749.12 |
| 2013/0221170 A1 * | 8/2013 | Catoni et al. | 248/188.3 |
| 2013/0313043 A1 * | 11/2013 | Lallier | 182/45 |

* cited by examiner

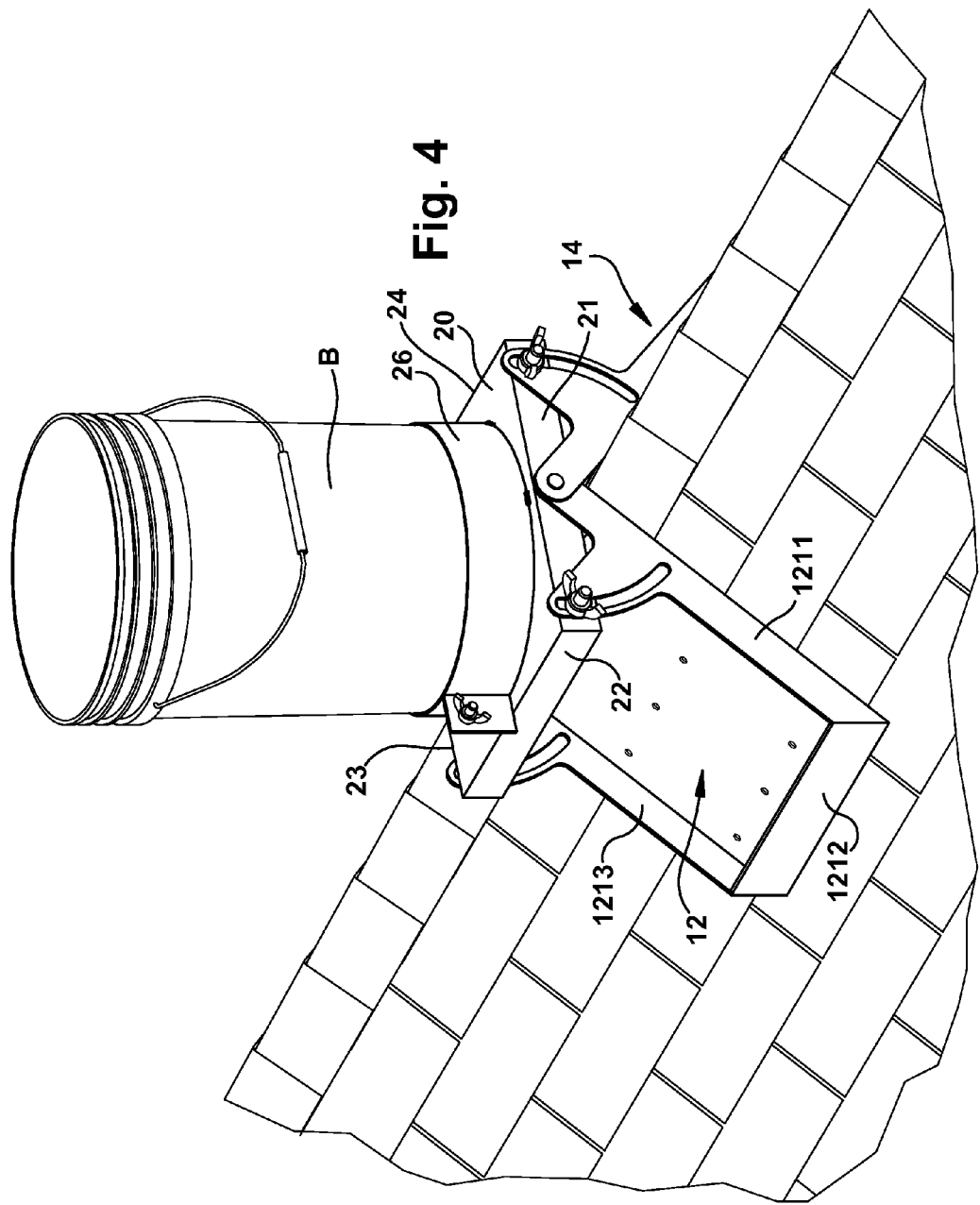

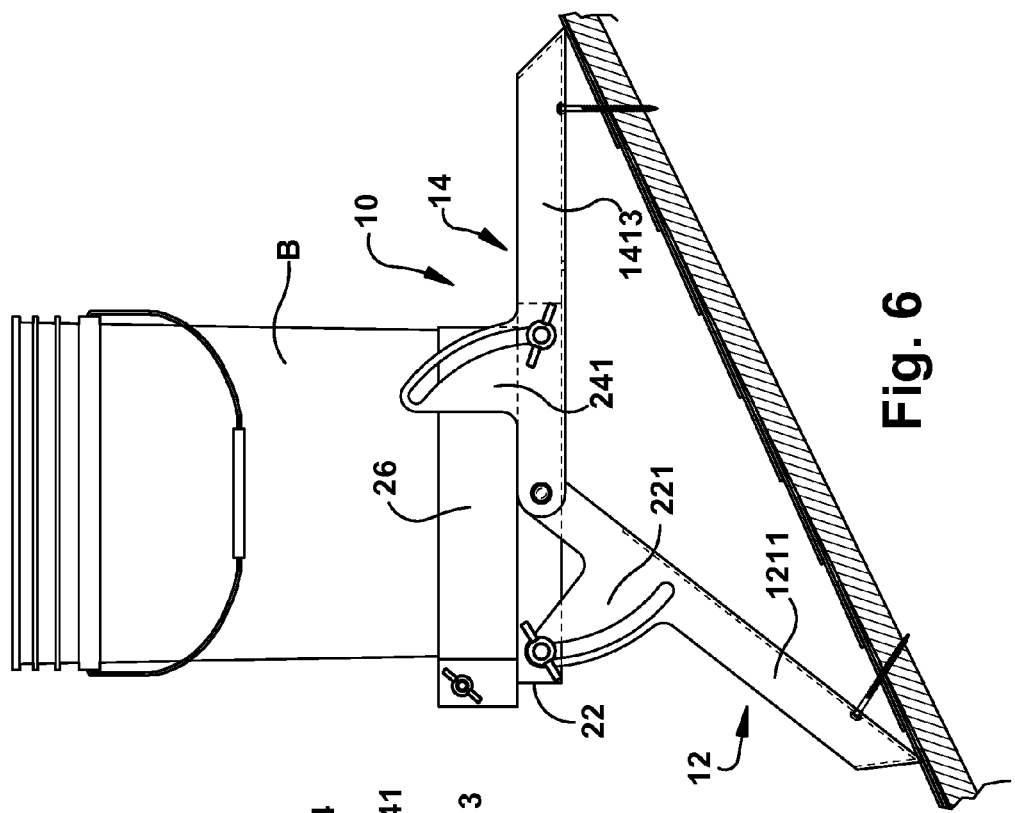
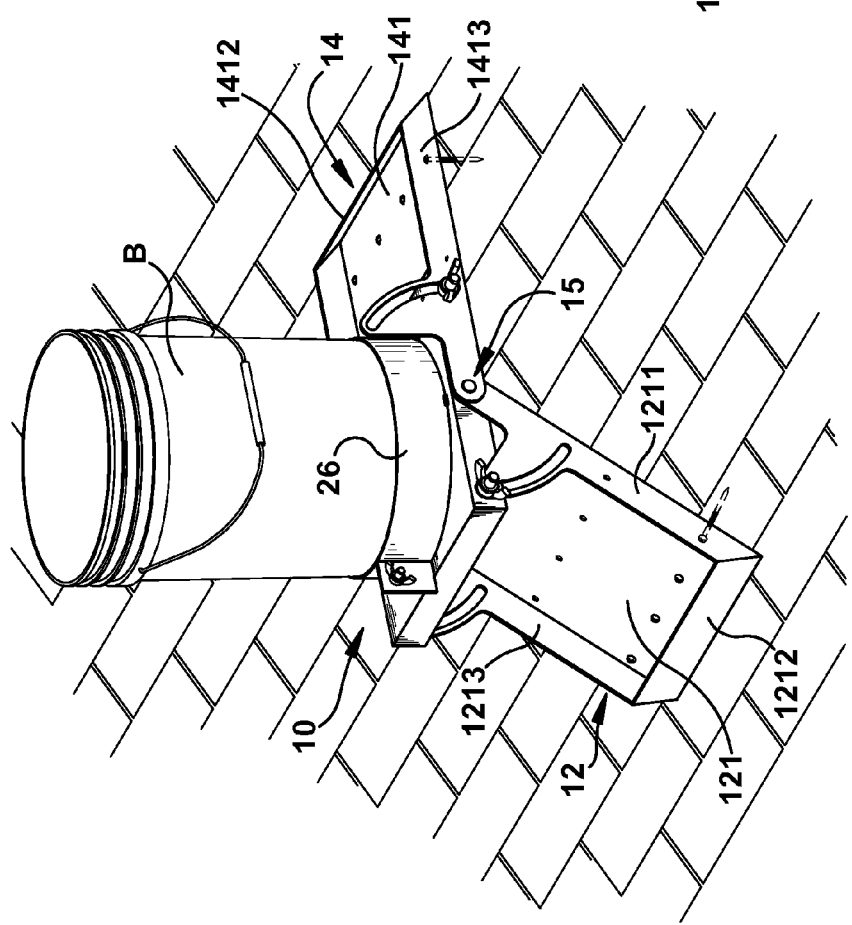

ROOFTOP DEVICE AND ROOFTOP DEVICE ASSEMBLIES

RELATED APPLICATIONS

This application claims priority to U.S. provisional patent application No. 61/532,308, filed Sep. 8, 2011.

FIELD OF THE INVENTION

The present disclosure and related inventions pertain to rooftop devices which can be used singularly as a support and holder for items on a rooftop and particularly on an inclined or pitched rooftop, and which can be used in tandem or multiples to provide rooftop support assemblies for construction or maintenance activities.

BACKGROUND OF THE INVENTION

For roof construction and maintenance, including roofing installation and repair and work on rooftop components such as chimneys, vents and waterproofing and drainage devices, workers generally rely on safety lines and/or fixtures which are temporarily attached to the roof structure, such as boards which are nailed to a roof deck, or hangers which are attached to the roof deck and which hold one or more boards in position as foot rests for workers. Ladder jacks are also available to temporarily hold a ladder in position relative to a roof. These devices attach directly to a roof deck and thus are oriented at the slope of the roof deck, and therefore do not provide any generally horizontal structure or support for a worker on the roof. Also, there are no rooftop devices which hold any objects other than boards as foot rests or ladders.

SUMMARY OF THE INVENTION

A rooftop mounted device and rooftop device assemblies for use on roofs, including pitched roofs, for holding tools or equipment or materials for roof construction, installation or masonry work of the like. Each rooftop mounted device has two adjustable legs configured for direct mounting to a roof surface, including inclined or pitched roof surfaces, the adjustable legs extending from and supporting a platform. By adjusting the angles at which the legs extend from the platform, the platform can be oriented in a horizontal or generally horizontal or level plane regardless of the pitch of the roof on which the device is mounted.

The platform can be of any suitable size, shape or configuration, or configured for attachment to or engagement with any other structure or device or container or brace or support to form rooftop assemblies, as further described.

BRIEF DESCRIPTION OF THE DRAWINGS

FIG. 4 is a perspective illustration of a rooftop device of the present disclosure in situ on a peak of a conventional pitched roof;

FIG. 5 is a perspective illustration of a rooftop device of the present disclosure on an inclined plane of a pitched roof;

FIG. 6 is a side elevation illustration of a rooftop device of the present disclosure on an inclined plane of a pitched roof;

DETAILED DESCRIPTION OF PREFERRED AND ALTERNATE EMBODIMENTS

Figure 1:
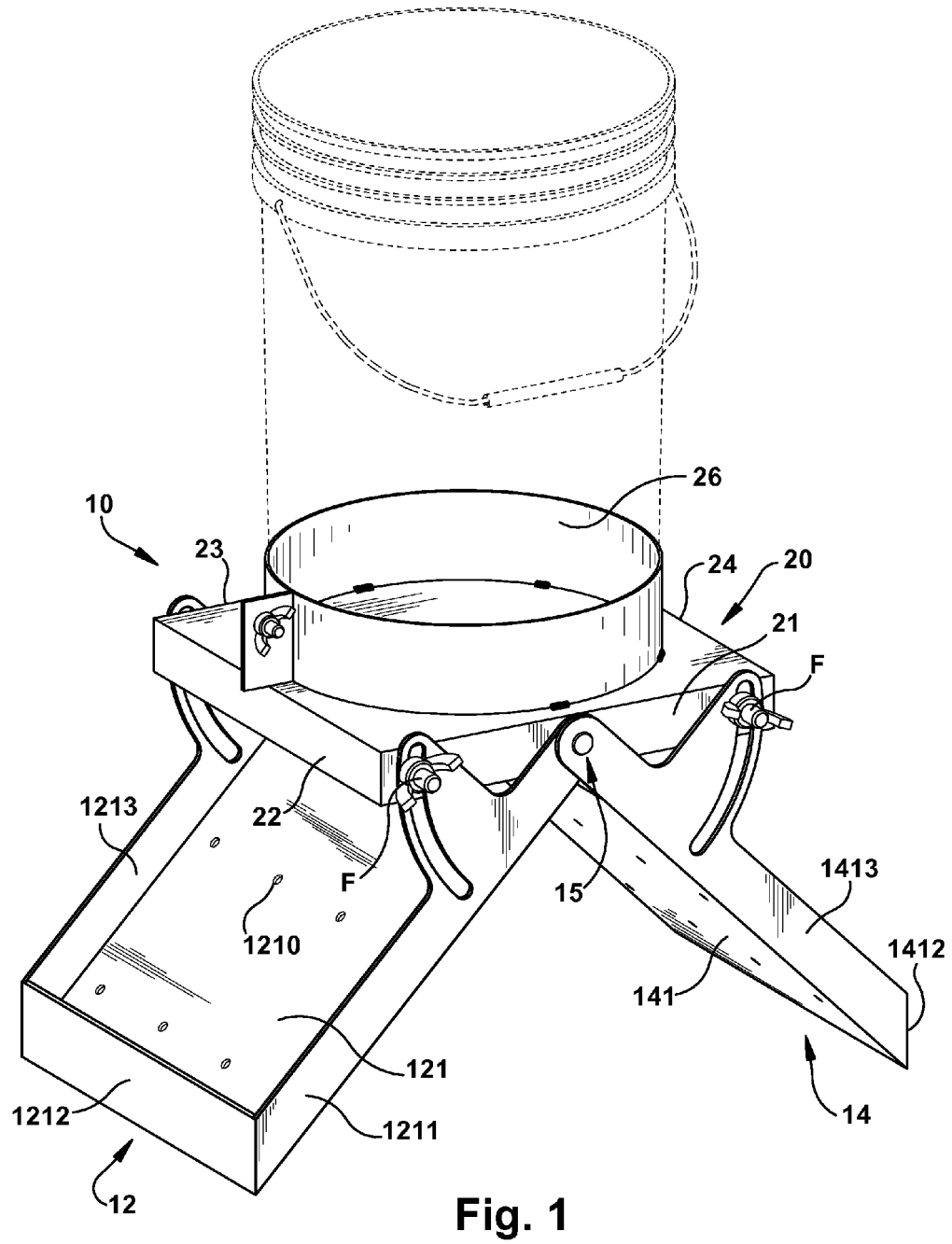
FIG. 1 is a perspective illustration of a rooftop device of the present disclosure.
Figure 3:
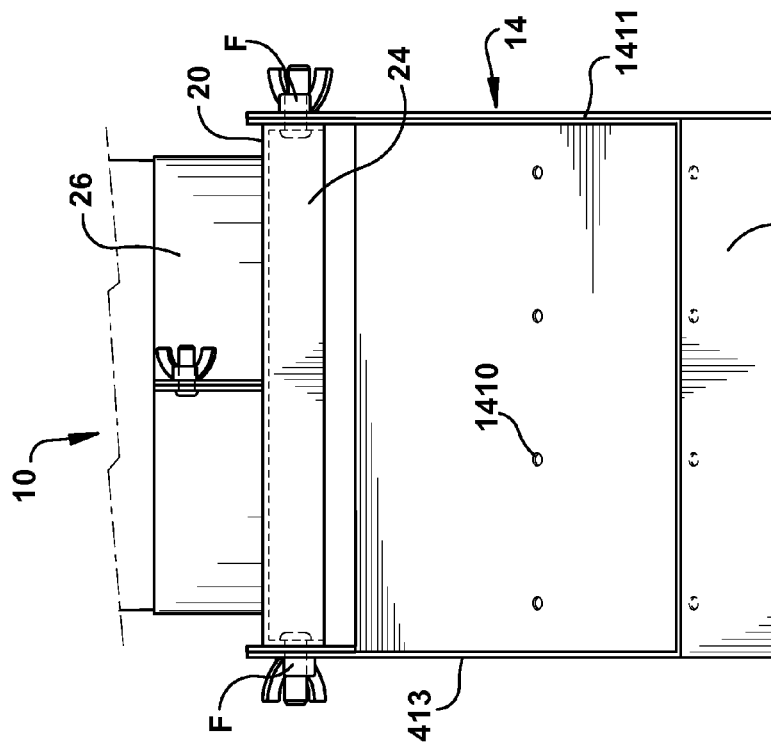
FIG. 3 is a side elevation illustration of the rooftop device of FIG. 1.
Figure 2:
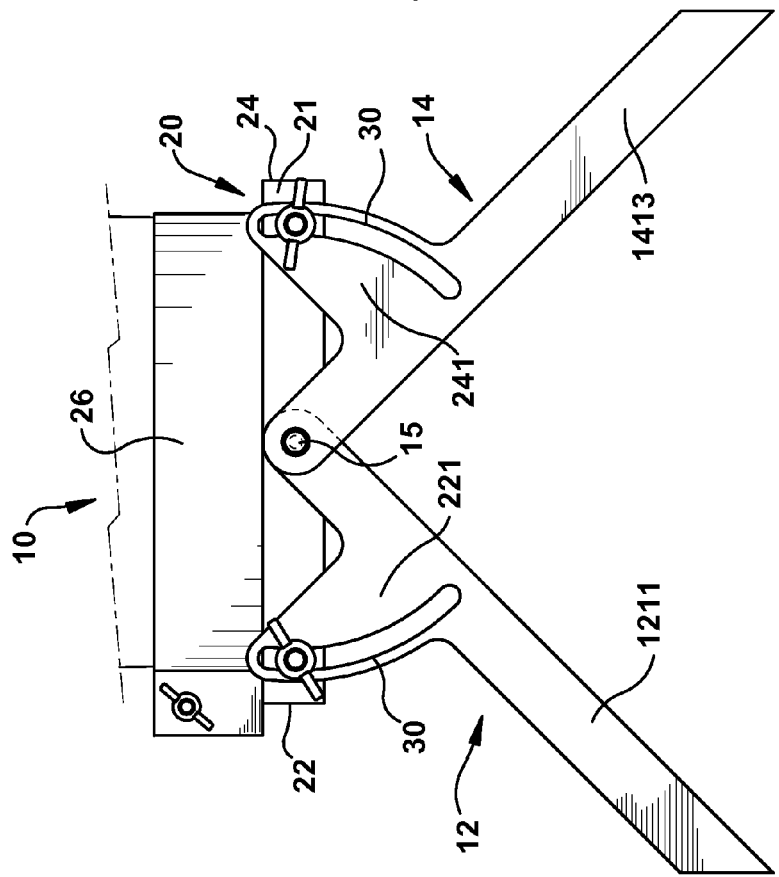
FIG. 2 is a side elevation illustration of the rooftop device of FIG. 1.

With reference to the accompanying drawings, FIGS. 1-8, there is illustrated in FIGS. 1-6 a rooftop device, indicated generally in its entirety at 10, which includes two legs 12 and 14, which in this embodiment are generally planar and are preferably interconnected at pivots or hinges 15 and 17, and adjustable with respect to a relative angle at the pivots or hinges 15, 17 and with respect to a platform, generally indicated at 20. The pivots or hinges 15, 17 may be for example in the form of pins which extend through side or perimeter walls of the legs 12, 14 to a platform 20 or an extension of the platform, as further described. This pivotal or hinged interconnection of the legs 12, 14 allows the legs to be oriented at any relative angle relative to each other and to platform 20 for any particular installation on any roof at any roof pitch angle, as shown for example in FIGS. 4-6. Each leg 12, 14 can preferably be similarly or identically configured. In the representative embodiment illustrated, each leg 12, 14 has a generally planar body 121, 141, and optionally perimeter walls 1211, 1212, 1213 on leg 12, and 1411, 1412, 1413 on leg 14 which form an upward facing enclosure or compartment or tray which can be used for holding tools or materials. The end perimeter walls 1212 and 1412 are preferably angled as shown with respect to the adjoining perimeter walls, to thereby provide a more secure storage containment within the walls when mounted on an inclined surface, as shown for example in FIG. 6. The distal ends of the legs 12, 14, which in this embodiment are defined by edges which are formed by the intersection of the planar body 121 and end perimeter wall 1212, and by planar body 141 and end perimeter wall 1412, provide the contact mounting edges for mounting of the device 10 to a surface or roof surface at any angle, as also shown in FIG. 6. Mounting holes 1210, 1410 are provided in the planar bodies 121, 141 of the legs 12, 14. Also, a high-friction contact coating or pad can be applied to the underside of each planar body 121, 141 of the legs 12, 14 for increased gripping force when the legs are in planar contact with a roof surface or surfaces, for example at a roof peak as shown in FIG. 4.

Each rooftop device 10 further includes a platform 20, which as illustrated may be generally planar and rectangular, or of any other suitable shape or configuration and may have perimeter walls 21, 22, 23 and 24 which add strength and stiffness. The platform 20 is interconnected with the legs 12, 14 at pivots or hinges 15, 17 for example by extension of hinge pins through opposing platform walls 22, 24 and by fasteners F which are held by supports 221 and 241 which extend upward from leg perimeter walls 1211/1213, 1411/1413 and through the respective platform walls 22, 24. The platform 20 has a width dimension, for example between parallel walls 21, 23, with a width dimension generally equal to a width dimension of the platform 20. An arcuate slot 30 is formed in each support 221, 241 through which the fasteners F such as screw type fasteners extend and travel as the legs 12, 14 pivot about hinges 15, 17. The positions of the legs 12, 14 relative to the platform 20 can be fixed by tightening fasteners F about the supports 221, 241 and the platform perimeter walls 22, 24.

Figure 8:
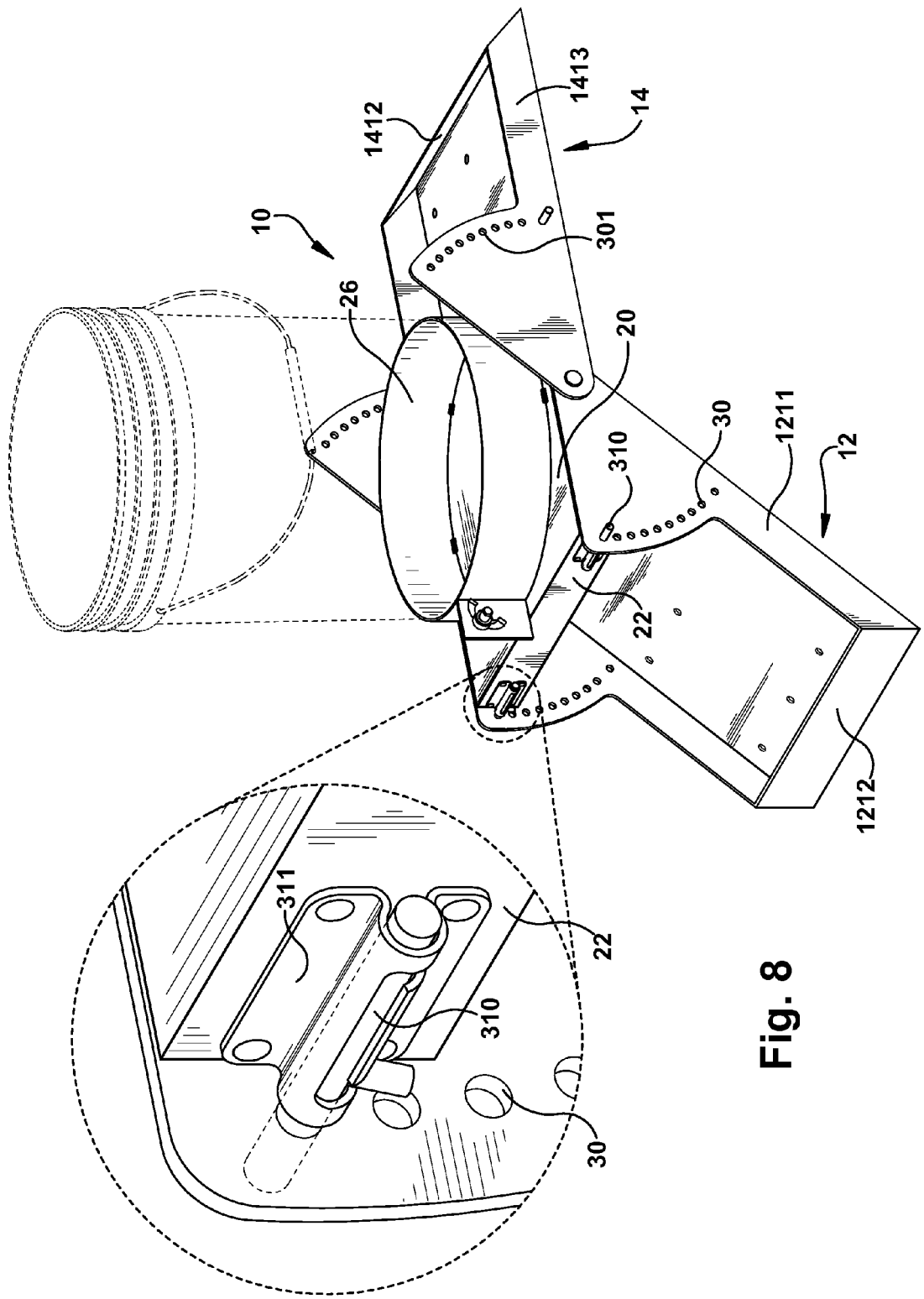
FIG. 8 is a perspective and enlarged area illustration of an alternate embodiment of a rooftop device of the present disclosure.

In an alternate embodiment of the rooftop device 10 illustrated in FIG. 8, the arcuate slots 30 in supports 221, 241 are replaced with a series of holes 301 arranged in an arcuate pattern and dimensioned to receive a distal end of a slide bolt 310 mounted by a guide 311 to perimeter walls 22, 24 to lock the legs 12, 14 in a desired relative angular position about hinges 15, 17.

As mentioned any particular attachment structure can be incorporated into or attached to the platform 20. One example of such an attachment structure is an attachment for a bucket B in the form of an annular band 26 which fits and can be tightened around the circumference of a bucket, such as at the base or bottom of the bucket as shown to center and hold the bucket upon the planar surface of platform 20. As noted other objects or structures can be otherwise secured or attached to the platform 20. With a bucket thus supported and secured, it provides a convenient storage place for tools, equipment and materials for work on a roof of any inclined surface. Any type of attachment structure or any configuration can be attached to or formed with the platform 20 to temporarily or permanently attach any object, device or other structure to the platform 20 for support by the rooftop device 10.

Figure 7:
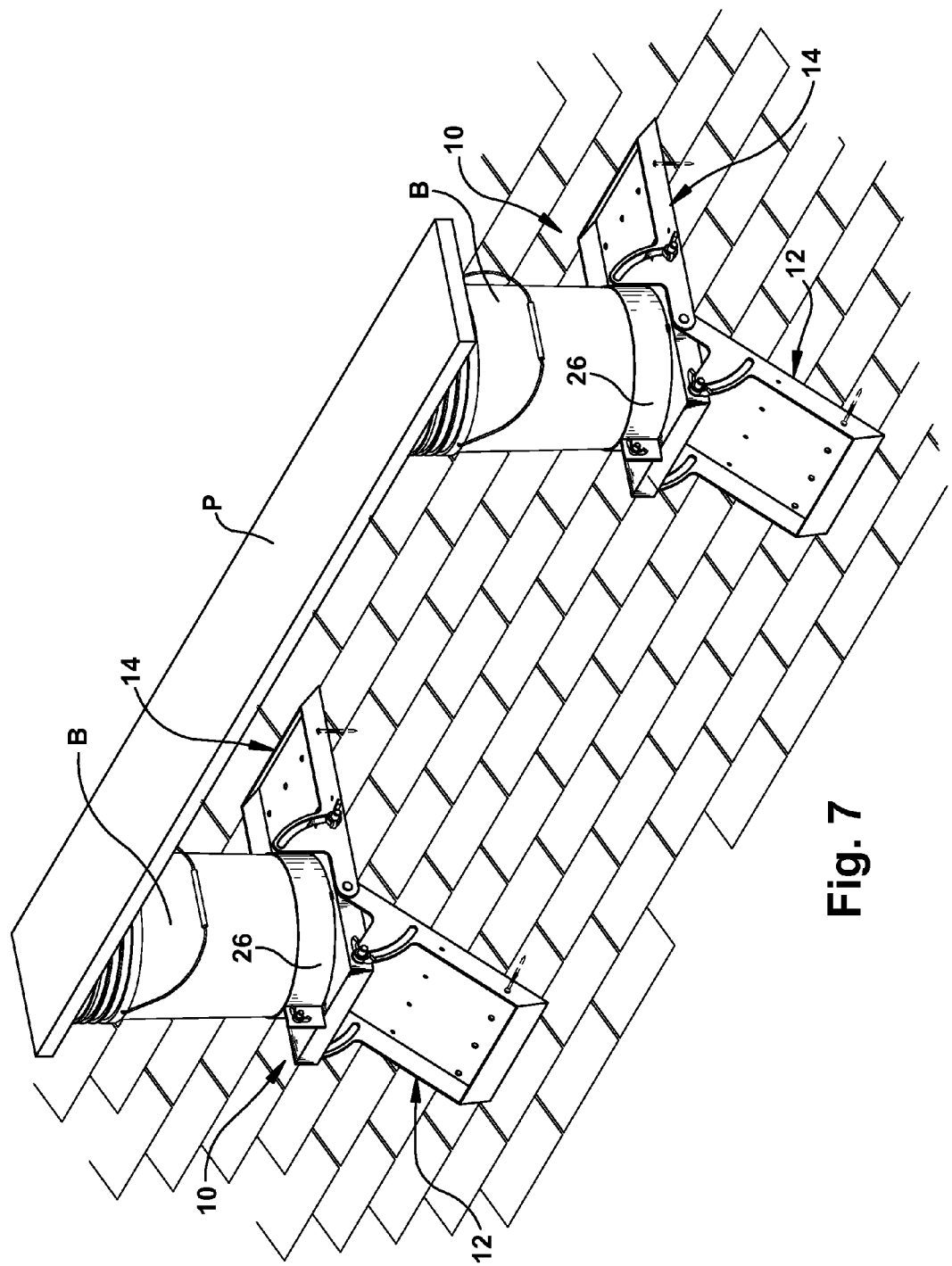
FIG. 7 is a perspective illustration of a rooftop device assembly which includes two rooftop devices of the present disclosure on an inclined plane of a pitched roof.

As shown in FIG. 7, with two or more rooftop devices 10 installed on a roof, for example on a pitched roof, a rooftop assembly can be formed by a plank P which is supported by the devices 10, either directly by the platforms 20 of each device, or on top of the buckets as shown. The plank provides a horizontal support or working surface for performing roof work such as roof installation, repair, maintenance or masonry work.

The invention claimed is:

1. A rooftop device comprising:

a generally planar platform, the generally planar platform having a generally planar surface and perimeter walls which extend downwardly from the generally planar surface;

a first leg, the first leg having a generally planar portion with a width dimension substantially equal to a width dimension of the generally planar platform and first leg perimeter walls which extend from the generally planar portion, and first and second supports which extend from the opposing first leg perimeter walls;

a second leg, the second leg having a generally planar portion with a width dimension substantially equal to a width dimension of the generally planar platform and second leg perimeter walls which extend from the generally planar portion, and third and fourth supports which extend from opposing second leg perimeter walls;

the first leg pivotally attached to the generally planar platform by first and second pivots in the perimeter walls of the generally planar platform, the first leg also adjustably attached to the generally planar platform by adjustable connection of the first and second supports at first and second connection points to opposing perimeter walls of the generally planar platform, the first and second connection points being spaced laterally from the first and second pivot points, and the second leg pivotally attached to the generally planar platform by the first and second pivots in the perimeter walls of the generally planar platform, the second leg also adjustably attached to the generally planar platform by adjustable connection of the third and fourth supports to opposing perimeter walls of the generally planar platform at third and fourth connection points to opposing perimeter walls of the generally planar platform, the third and fourth connection points being spaced laterally from the first and second pivot points.

\* \* \* \* \*